2 Sheets—Sheet 2.
W. R. HAVENS.
Friction Clutch and Brake.
No. 220,613. Patented Oct. 14, 1879.
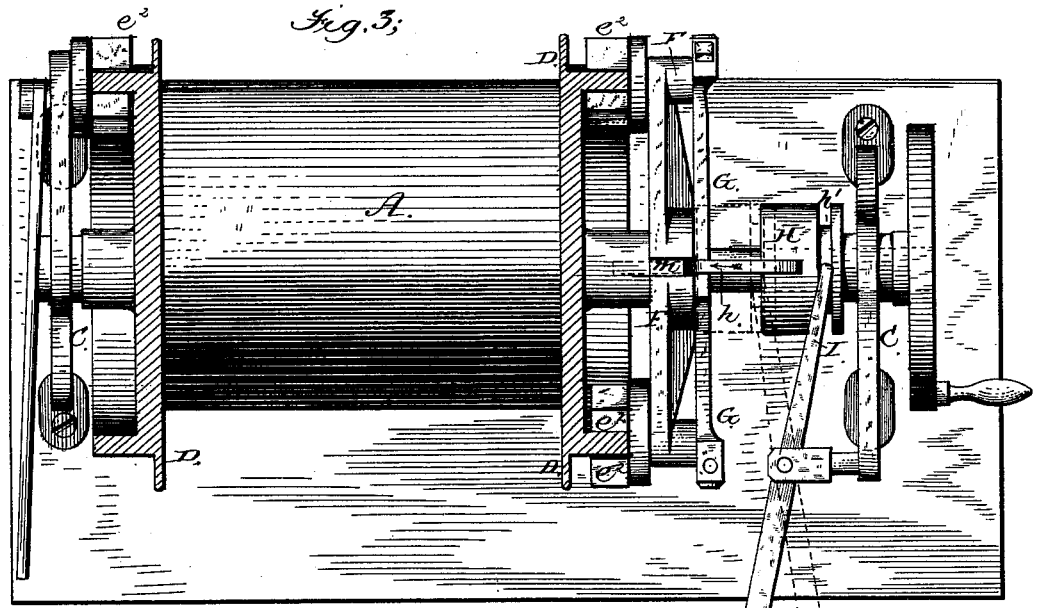
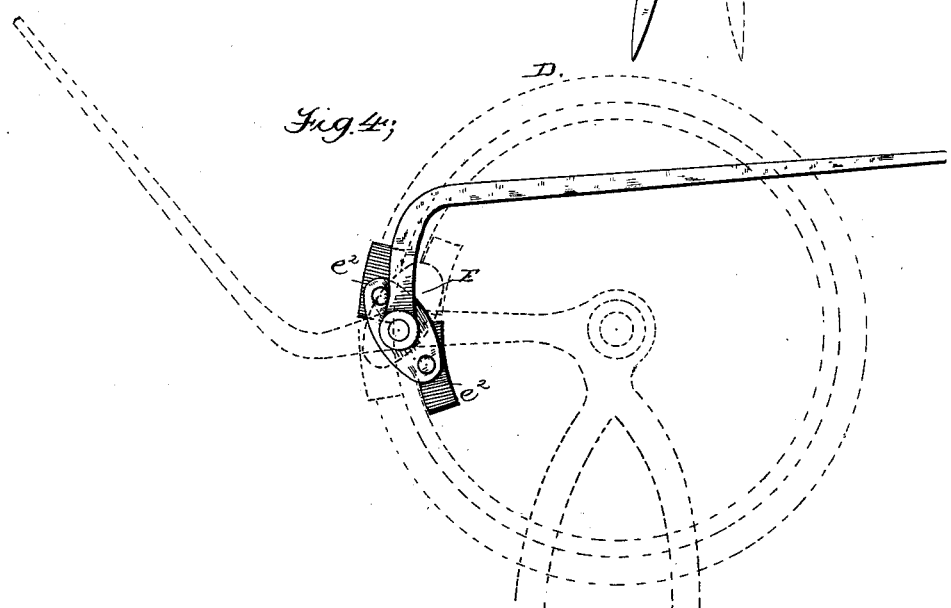
Witnesses:
T. Walter Fowler,
Alex. Scott
Inventor:
Wm. R. Havens
per Attys.
A. H. Evans & Co

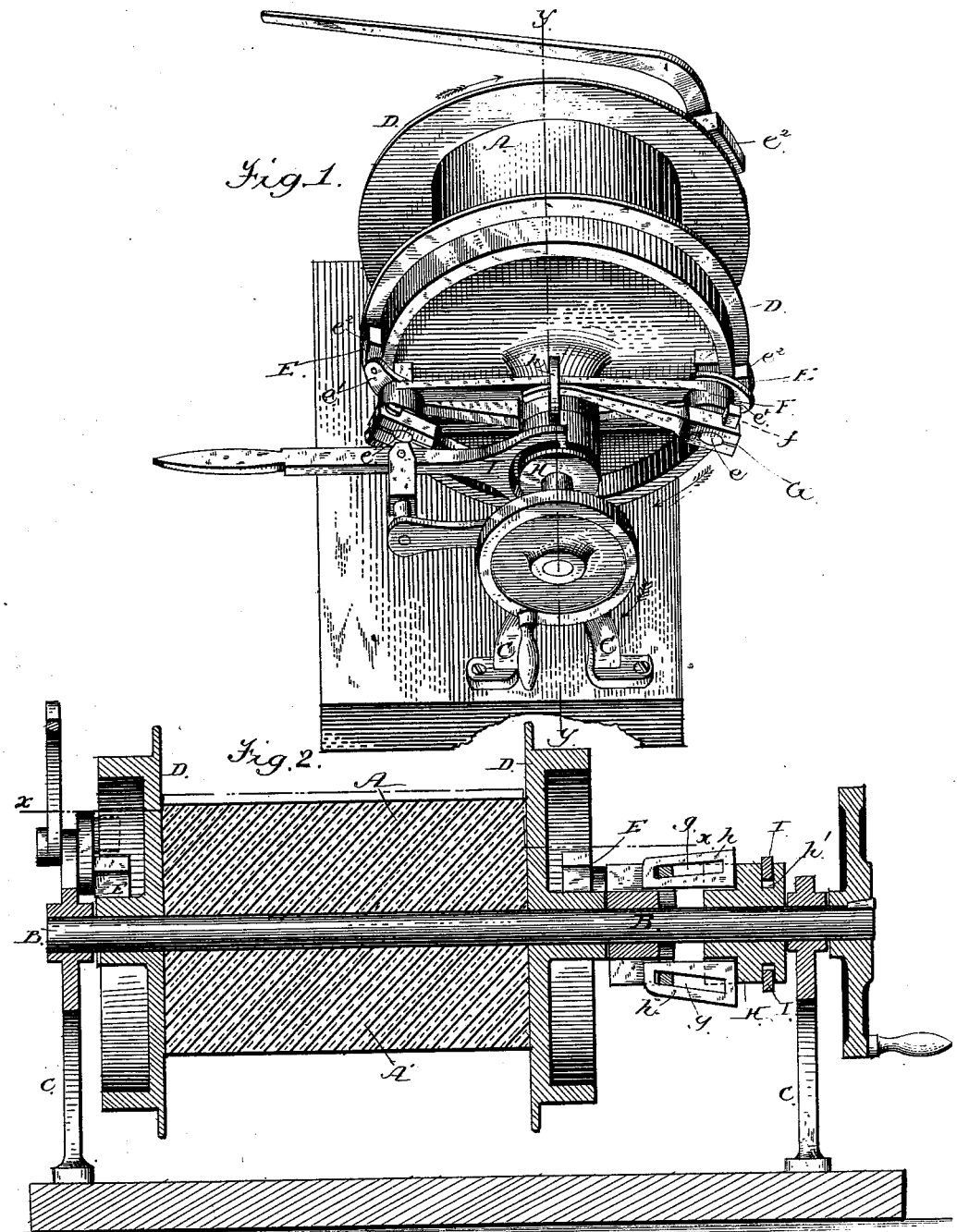

UNITED STATES PATENT OFFICE.

WILLIAM R. HAVENS, OF DENVER, COLORADO.

IMPROVEMENT IN FRICTION CLUTCHES AND BRAKES.

Specification forming part of Letters Patent No. 220,613, dated October 14, 1879; application filed August 25, 1879.

*To all whom it may concern:*

Be it known that I, WM. R. HAVENS, of Denver, in the county of Arapahoe and State of Colorado, have invented certain new and useful Improvements in Friction Clutches and Brakes; and I do hereby declare the following to be a full, clear, and exact description thereof, reference being had to the accompanying drawings, making a part of this specification, and in which—

Figure 1 is a perspective view. Fig. 2 is a vertical central longitudinal section. Fig. 3 is a plan view. Fig. 4 is an end view, showing the lever in different positions in dotted lines.

This invention relates to certain new and useful improvements in the class of friction-clutches that are adapted to engage with an annular rim secured to a cylinder, wheel, or other body to be moved; and the invention consists, essentially, in a novel construction of clutch or brake mechanism, whereby the friction is simultaneously applied to the outside and inside of the annular rim, all as will be hereinafter fully described and claimed.

To enable others skilled in the art to make and use my invention, I will proceed to describe the exact manner in which I have carried it out.

In the drawings, A represents a spool, loosely mounted on a shaft, B, journaled in the standards or supports C C. This spool has secured to its ends annular rims or rings D D, with which the friction clutches or brakes E E engage.

Upon the shaft B, at one end of the spool A, is mounted a bar, F, having transverse holes $f f$ through the same near its ends, and through which pass the journal-rods $e e$. These journal-rods $e e$ have rigidly secured to their inner ends, facing the spool, metallic plates $e^1$ $e^1$, arranged diagonally to the bar F, so that the brake-shoes $e^2$ $e^2$, secured to the opposite ends of the plates $e^1$ $e^1$, will come on the opposite sides of the annular rim or ring D.

To the outer ends of the journal-rods $e^1$ $e^1$ are secured the outer ends of the levers G G, the inner ends of said levers passing through the elongated slots $g g$ in the brackets $h h$, secured to a ring, H, loosely mounted on the shaft B, said ring being provided with an annular groove, $h'$, for the reception of a clutch-lever, I, pivoted to the short arm of a right-angled bar projecting horizontally from one of the supports or standards C.

The slots in the brackets incline outward from their inner toward their outer ends, so that in sliding the ring H toward the spool the inner ends of the levers G G will be thrown outward or away from the shaft, which movement oscillates the journal-rods $e e$ sufficiently to cause the shoes $e^2$ $e^2$ to engage with the inner and outer sides of the rim or ring D, a reverse movement of the ring H drawing the inner ends of the lever G toward the shaft B, thus releasing or throwing the shoes $e^2$ $e^2$ out of engagement with said rim or ring.

In using said clutch mechanism for a brake, the sliding ring and slotted brackets are dispensed with, and the levers secured directly to the outer end of the journal-rod $e$, (see Fig. 4,) when, by merely pressing down on said lever, the journal-rod will be turned so that the shoes will engage with said rim or ring, and by raising up said lever the shoes will be released from contact with, or thrown out of engagement with, said rim or ring.

The ring H is prevented from turning on the shaft B by means of the brackets working in transverse grooves $m m$ in the bar F.

Having thus described my invention, I claim as new and desire to secure by Letters Patent—

1. A clutch or brake consisting of a plate adapted to be oscillated by a lever or other equivalent means, and provided with shoes $e^2$ $e^2$, engaging with the outer and inner sides of an annular rim or ring secured to a wheel or other body to be moved, substantially as herein shown and described.

2. The plate or plates $e^1$ $e^1$, provided with the shoes $e^2$ $e^2$, and secured to the rod or rods $e e$, journaled in the ends of the arm or arms F, in combination with the lever or levers G G and sliding ring H, provided with the diagonally-slotted bracket or brackets $h$, substantially as and for the purpose shown and described.

WILLIAM REESE HAVENS.

Attest:
 ELBERT HEADLEY,
 J. W. NESMITH.